United States Patent [19]
Osakabe et al.

[11] Patent Number: 5,402,419
[45] Date of Patent: Mar. 28, 1995

[54] TRANSMITTING METHOD, RECEIVING METHOD, AND COMMUNICATION METHOD FOR BI-DIRECTIONAL BUS SYSTEM, AND BI-DIRECTIONAL BUS SYSTEM

[75] Inventors: Yoshio Osakabe, Kanagawa; Shigeo Tanaka, Tokyo; Akira Katsuyama; Hiroshi Yamazaki, both of Kanagawa; Yasuo Kusagaya, Tokyo; Noriko Kotabe, Chiba; Kouichi Sugiyama; Makoto Sato, both of Kanagawa, all of Japan

[73] Assignee: Sony Corporation, Tokyo, Japan

[21] Appl. No.: 169,451

[22] Filed: Dec. 17, 1993

[30] Foreign Application Priority Data

Dec. 21, 1992 [JP]  Japan ................................. 4-340407
Oct. 8, 1993 [JP]  Japan ................................. 5-253455

[51] Int. Cl.⁶ .................................................. H04L 12/40
[52] U.S. Cl. ........................... 370/85.1; 370/94.1; 370/110.1; 340/825.07; 340/825.52; 348/8
[58] Field of Search ............ 370/60, 85.1, 85.11, 370/85.13, 92, 94.1, 99, 110.1; 340/825.07, 825.52, 825.53; 348/6, 7, 8, 461, 474, 705, 706, 722; 395/200

[56] References Cited
U.S. PATENT DOCUMENTS

| | | | |
|---|---|---|---|
| 4,872,162 | 10/1989 | Tanaka et al. | 370/94.1 |
| 5,107,256 | 4/1992 | Ueno et al. | 340/825.52 |
| 5,130,793 | 7/1992 | Bordry et al. | 348/6 |
| 5,313,408 | 5/1994 | Goto | 395/200 |

FOREIGN PATENT DOCUMENTS

0360338  9/1989  European Pat. Off. .

OTHER PUBLICATIONS

Patent Abstracts of Japan, vol. 5, No. 74 (E–57), 16 May 1981 & JP–A–56 021 446 (Fujitsu Ltd.).

Primary Examiner—Douglas W. Olms
Assistant Examiner—Hassan Kizou
Attorney, Agent, or Firm—Jerry A. Miller

[57] ABSTRACT

A communication system using a bi-directional bus, comprises a plurality of devices (e.g., TV Image Receiver, Video Tape Recorder, etc.) respectively including sub-devices (e.g., Monitor Image Receiver, TV tuner, Video Deck, etc.) adapted for executing the operation for a received control command. Each device comprises a transmit signal formation unit for forming a transmit signal having a frame structure consisting of an address field for specifying addresses of devices between which communication is carried out, and a data field for specifying a control command for a device or a sub-device, and including a channel select code of a fixed length, inserted at a predetermined position of the data field, indicating communication from a sub-device included in a device to any other device, communication from a device to a sub-device included in any other device, or communication from a device to a device; and a bus output unit for outputting, to the bi-directional bus, the transmit signal formed by the transmit signal formation unit.

14 Claims, 15 Drawing Sheets

| Bit number | Meaning | |
|---|---|---|
| 7 | Always 0 | |
| 6 | Reserved for future standardization, "1" | |
| 5, 4 | Source service code | 00 ; CT |
| | | 01 ; AV/C |
| | | 10 ; HK |
| | | 11 ; reserved |
| 3, 2 | Destination service code | 00 ; CT |
| | | 01 ; AV/C |
| | | 10 ; HK |
| | | 11 ; reserved |
| 1 | 1/0 without/with SSDA | |
| 0 | 1/0 without/with DSDA | |

FIG.3

|  | OPERAND (OPR) | | | | | | | | OPERATION CODE (OPC) | | | | | | |
|---|---|---|---|---|---|---|---|---|---|---|---|---|---|---|---|
| HIGHER ORDER 4 BITS | 0 | 1 | 2 | 3 | 4 | 5 | 6 | 7 | 8 | 9 | A | B | C | D | E | F |
| LOWER ORDER 4 BITS 0-F | RESERVED | | ASCII CODE CONTROLLING VALUE ALIAS CODE | | | | STANDARD OPR | | RESERVED | | GENERAL COMMANDS | | FUNCTION COMMANDS GROUP | | SPECIAL FUNCTION COMMAND GROUP | |

FIG.5

| MSB | | | | | | | LSB |
|---|---|---|---|---|---|---|---|
| b7 | b6 | b5 | b4 | b3 | b2 | b1 | b0 |
| 0 | * | * | * | * | * | \multicolumn{2}{c}{00 : DISABLE  01 : COMMUNICATION FROM SUB-DEVICE TO DEVICE  10 : COMMUNICATION FROM DEVICE TO SUB-DEVICE  11 : COMMUNICATION FROM DEVICE TO DEVICE} | |

FIG.10

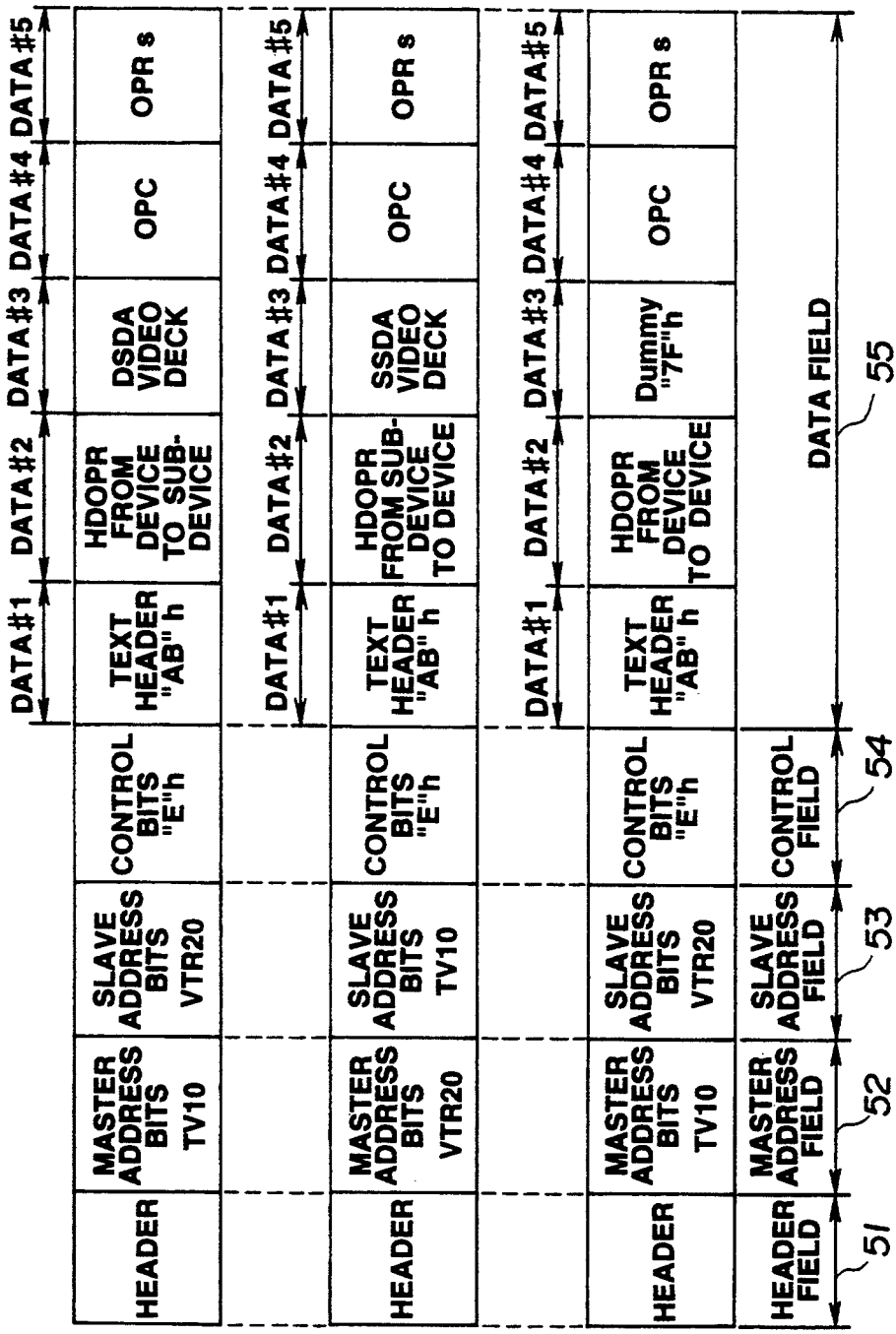

| Operation code (OPC) | | Operand (OPR) | |
|---|---|---|---|
| Code | Attribute | Code | Attribute |
| C0 | REPEAT | 60 | ON |
| | | 70 | OFF |
| | | 76 | AUTO |
| C1 | MEDIUM | 60 | OFF |
| | | 70 | ON |
| | | 71 | SET |
| C2 | RECORD | 60 | OFF |
| | | 70 | ON |
| | | 20 | DUBBING |
| | | 21 | INSERT |
| | | 22 | INSERT MARKER |
| | | 23 | ASSEMBLE |
| | | 24 | CLEAR TAPE |
| | | 25 | RECORDING BLANK |
| | | 26 | PAUSE |
| C3 | PLAY | 75 | FORWARD |
| | | 71 | SET |
| | | 65 | REVERSE |
| | | 6D | STILL |
| | | 20 | SLOW |
| | | 21 | FAST |
| | | 22 | SEARCH |
| | | 23 | SCAN |
| C4 | WIND | 60 | OFF (STOP) |
| | | 75 | FORWARD |
| | | 65 | REVERSE |
| | | 22 | SEARCH |
| C5 | SPEED | 6F | STANDARD |
| | | 63 | DECREMENT |
| | | 73 | INCREMENT |
| | | 71 | SET |
| C6 | DIRECTION | 6F | NORMAL |
| | | 65 | REVERSE |
| | | 76 | SEQUENTIAL |
| C7 | HIGH FIDELITY SELECTION | 6F | NORMAL |
| | | 20 | HIGH FIDELITY |
| | | 21 | MIX |
| C8 | CHAPTER NO. | 63 | DECREMENT |
| | | 73 | INCREMENT |
| | | 71 | SET |
| | | 61 | CLEAR |
| | | 74 | INDICATE |
| | | 64 | INDICATOR OFF |

FIG.12

| Operation code (OPC) | | Operand (OPR) | |
|---|---|---|---|
| Code | Attribute | Code | Attribute |
| C9 | TRACK NO. | 63<br>73<br>71<br>61<br>74<br>64 | DECREMENT<br>INCREMENT<br>SET<br>CLEAR<br>INDICATE<br>INDICATOR OFF |
| CA | PICTURE NO. | 63<br>73<br>71<br>61<br>74<br>64 | DECREMENT<br>INCREMENT<br>SET<br>CLEAR<br>INDICATE<br>INDICATOR OFF |
| CB | INDEX NO. | 63<br>73<br>71<br>61<br>74<br>64 | DECREMENT<br>INCREMENT<br>SET<br>CLEAR<br>INDICATE<br>INDICATOR OFF |
| CC | TIME INDICATION | 63<br>73<br>71<br>61<br>74<br>64 | DECREMENT<br>INCREMENT<br>SET<br>CLEAR<br>INDICATE<br>INDICATOR OFF |
| CD | TAPE SELECTION | 76<br>21<br>22<br>23<br>24 | AUTO<br>IEC I<br>IEC II<br>IEC III<br>IEC IV |
| CE<br>...<br>DF | RESERVED FOR FUTURE STANDARDIZATION | | |

FIG.13

| Operation code (OPC) | | Operand (OPR) | |
|---|---|---|---|
| Code | Attribute | Code | Attribute |
| C0 | BAND | 20 | VHF/FM SOUND RADIO |
| | | 21 | MW SOUND RADIO |
| | | 22 | LW SOUND RADIO |
| | | 30 | VHF LOW |
| | | 31 | VHF MEDIUM |
| | | 32 | VHF HIGH |
| | | 33 | VHF SUPER |
| | | 40 | UHF TELEVISION |
| | | 48 | SHF TELEVISION |
| | | 50 | SW SOUND RADIO MEDIUM |
| | | 51 | SW SOUND RADIO HIGH |
| | | 52 | SW SOUND RADIO SUPER |
| C1 | CHANNEL | 63 | DECREMENT |
| | | 73 | INCREMENT |
| | | 71 | SET |
| | | 61 | CLEAR |
| | | 74 | INDICATE |
| | | 64 | INDICATOR OFF |
| | | 23 | SCAN |
| | | 22 | SEARCH |

FIG.14

| Operation code (OPC) | | Operand (OPR) | |
|---|---|---|---|
| Code | Attribute | Code | Attribute |
| C2 | FREQUENCY | 63 | DECREMENT |
| | | 73 | INCREMENT |
| | | 71 | SET |
| | | 61 | CLEAR |
| | | 74 | INDICATE |
| | | 64 | INDICATOR OFF |
| | | 23 | SCAN |
| | | 22 | SEARCH |
| C3 | PRESET | 63 | DECREMENT |
| | | 73 | INCREMENT |
| | | 71 | SET |
| | | 61 | CLEAR |
| | | 74 | INDICATE |
| | | 64 | INDICATOR OFF |
| | | 23 | SCAN |
| | | 22 | SEARCH |
| C4 | BROADCAST SOUND | 20 | MAIN |
| | | 21 | SUB |
| | | 22 | MAIN+SUB |
| | | 23 | STEREO |
| | | 24 | AUTO STEREO |
| | | 25 | MONO |
| | | 26 | BROADCAST SATELLITE MODE A (TV) |
| | | 27 | BROADCAST SATELLITE MODE A |
| | | 28 | BROADCAST SATELLITE MODE B |
| C5 ... DF | RESERVED FOR FUTURE STANDARDIZATION | | |

FIG.15

TRANSMITTING METHOD, RECEIVING METHOD, AND COMMUNICATION METHOD FOR BI-DIRECTIONAL BUS SYSTEM, AND BI-DIRECTIONAL BUS SYSTEM

BACKGROUND OF THE INVENTION

1. Field of the Invention

This invention relates to a transmitting method, a receiving method, a communication method, and a bi-directional bus system, which are used in a system in which devices, e.g., a television image receiver or a video tape recorder, etc. are connected to each other by using a bi-directional bus to control, from other devices, sub-devices, e.g., a monitor image receiver, a TV tuner, or a video deck, etc. included in the devices.

2. Description of the Related Art

In recent years, there have been popularly used systems in which a plurality of audio equipments or visual equipments (hereinafter referred to as AV equipments) are connected by means of video signal lines or audio sinal lines (hereinafter referred to as AV signal lines).

In such AV systems, equipments are connected by means of a system control bus (hereinafter simply referred to as a bi-directional bus) in addition to the above-described AV signal lines to control respective equipments. In a practical sense, Audio, Video and audiovisual systems Domestic Digital Bus (hereinafter referred to as D2B) standardized by the so-called publication 1030 of IEC, a Home Bus System (hereinafter referred to as HBS) standardized by the ET-2101 of EIAJ, and the like are known. Through the bi-directional bus, other devices are controlled from equipments (devices), e.g., a television image receiver, a video tape recorder, and a video deck player (hereinafter respectively referred to as TV, VTR, VDP), etc., or sub-devices, e.g., a monitor image receiver (TV monitor), a TV tuner, a video deck, or an amplifier, etc. included in other devices are controlled from devices.

Namely, communication from a sub-device included in a device to a sub-device included in any other device (hereinafter referred to as communication from sub-device to sub-device), communication from a sub-device included in a device to any other device (hereinafter referred to as communication from sub-device to device), communication from a device to a sub-device included in any other device (hereinafter communication from device to sub-device), and communication from a device to any other device are carried out through a bi-directional bus. In other words, communications are carried out through a plurality of routes (paths).

The format of a transmit signal used in a bi-directional bus as described above, e.g., D2B will now be described. In D2B, control commands for controlling a sub-device of destination, etc. and/or data indicating the operating state, etc. are caused to have a frame configuration as shown in FIG. 1, and are transmitted through the bi-directional bus.

Namely, one frame consists of a header field 101 for specifying the header indicating the leading portion of the frame, a master address field 102 for specifying a source device address, a slave address field 103 for specifying a destination device address, a control field 104 for specifying control bits indicating communication, etc, in the state where a destination device is in a lock state, or in non-lock state, and a data field 105 for specifying control commands or data, The header of the header field 101 consists of, as shown in FIG. 2, a start bit 101a of one bit for providing synchronization, and mode bits 101b for prescribing a transmission speed (rate) or the number of bytes of the data field 106. These mode bits 101b are 1~3 bits. At present, three modes of mode 0 where the data field 105 is comprised of 2 bytes at the maximum, mode 1 where the data field 105 is comprised of 32 bytes at the maximum (16 bytes at the maximum in the case of communication from slave to master), and mode 2 where the data field 105 is comprised of 128 bytes at the maximum (64 bytes at the maximum in the case of communication from slave to master) are prescribed.

The source device address of the master address field 102 consists of, as shown in the above-mentioned FIG. 2, master address bits 102a of 12 bits for specifying a source device address, and a parity bit 102b of 1 bit.

The destination device address of the slave address field 103 consists of, as shown in the above-mentioned FIG. 2, a slave address bits 103a of 12 bits for specifying a destination device address, a parity bit 103b of 1 bit, and an acknowledge bit 103c of 1 bit for sending acknowledge from the destination device.

The content of the control field 104 consists of, as shown in the above-mentioned FIG. 2, control bits 104a comprised of 4 bits indicating the direction of the control command, or indicating the lock state or the non-lock state, a parity bit 104b of 1 bit, and an acknowledge bit 104c of 1 bit.

In the data field 105, as shown in the above-mentioned FIG. 2, data bits 105a of 8 bits, end of data bit 105b of 1 bit and parity bit 105c of 1 bit are repeated as occasion demands. Assuming now that data bits 105a are assumed to be data #1, #2, #3, . . . in order from the beginning, e.g., Operation code (hereinafter referred to as OPC) "Begin 2" (i.e., code "BD"h (h represents hexadecimal notation)) indicating communication relating to sub-device, OPC "Begin 1" ("BC" h) indicating communication through HBS, and OPC "Begin 0" ("BB"h) indicating communication through other bus, etc. are assigned (allocated) to data #1. Further, Operand (hereinafter referred to as OPR) with respect to these OPCs are assigned to data #2.

OPR with respect to these OPCs, e.g., OPR with respect to OPC "begin 2" consists of, as shown in FIG. 3, bits $b_5$, $b_4$, $b_3$, $b_2$ ($b_7$ is the Most Signicant Bit (MSB) for identifying service codes of the Communication Telephony (CT) system, the Audio Video and Control (AV/C) system, and the Housekeeping (HK) system, etc.; and bits $b_1$, $b_0$ indicating any one of communication from sub-device to sub-device, communication from sub-device to device, communication from device to sub-device, and communication from device to device, viz., indicating presence or absence of Source Sub-Device Address (hereinafter referred to as SSDA) or Designation Sub-Device Address (hereinafter referred to as DSDA). It is to be noted that bit $b_7$ is caused to be always zero, and bit $b_6$ is reserved for future standardization and is caused to be 1 at present. In more practical sense, $b_1=0$, $b_0=0$ indicates communication from sub-device to sub-device; $b_1=0$, $b_0=1$ indicates communication from sub-device to device; $b_1=1$, $b_0=0$ indicates communication from device to sub-device; and $b_1=1$, $b_0=1$ indicates communication from device to device.

Accordingly, e.g., in the communication from a sub-device of a TV (device) to a video deck (sub-device) of a VTR (other device), as shown in FIG. 4A, an address of TV is assigned as master address bits to the master address field 102; an address of VTR is assigned as slave address bits to the slave address field 103; and a code "A"h indicating write of a control command, e.g., from master to slave is assigned to the control field 104. Further, OPC "Begin 2" is assigned to data #1; e.g., code "54"h indicating communication from sub-device to sub-device is assigned to data #2 as OPR for OPC "Begin 2"; an address of a sub-device of TV is assigned to data #3 as SSDA; and an address of a sub-device of VTR is assigned to data #4 as DSDA. To the subsequent data #5, e.g., control command for playing (reproducing) the video deck of VTR is assigned.

Further, e.g., in the communication from sub-device of TV to VTR (device), as shown in 4B, address of TV, address of VTR and code "A"h indicating write of control command from master to slave are respectively assigned to the master address field 102~the control field 104, Further, OPC "Begin 2" is assigned to data #1, code "55"h indicating communication from sub-device to device is assigned to data #2, and address of sub-device of TV is assigned to data #3 as SSDA. Further, control command is assigned to data #4, Namely, in this case, since there is no destination sub-device, assignment of DSDA is unnecessary, Further, e.g., in the communication from TV (device) to sub-device of VTR, as shown in FIG. 4C, address of TV, address of VTR and code "A"h indicating write of control command from master to slave are respectively assigned to the master address field 102~the control field 104. Further, OPC "Begin 2" is assigned to data #1, code "56"h indicating communication from device to sub-device is assigned to data #2, and an address of sub-device of VTR is assigned to data #3 as DSDA. In addition, control command is assigned to data #4. Namely, in this case, since there is no source sub-device, assignment of SSDA is unnecessary.

In addition, e.g., in the communication from TV (device) to VTR (device), as shown in FIG. 4D, address of TV, address of VTR, and code "A"h indicating write of the control command from master to slave are respectively assigned to the master field 102~the control field 104. Since there is no communication relating to the sub-device, control command is assigned to data #1. Namely, assignments of OPC "Begin 2", SSDA and DSDA are unnecessary.

The control command will now be described. The number of codes that can be represented by 8 bits is 256. However, with 256 kinds of codes, it is not sufficient to carry out control of the entirety of the AV equipment. In view of this, in HBS or D2B, a command Table comprised of OPC and OPR shown in FIG. 5 is used.

Namely, the command Table consists of OPC of 1 byte indicating the name of a controlled system, and OPR of 1 byte or plural bytes indicating the control content. General commands commonly used for respective equipments are assigned to code "AO"h~code "BF"h of OPC, a group of function commands are assigned to code "CO"h~code "DF"h, and a group of special function commands are assigned to code "EO"h~code "FF"h. In this case, code "80"h~code "9F"h are reserved.

In more practical sense, control commands such as video commands, audio commands, deck/player commands or tuner commands, etc. share, e.g., the area of the function command group (code "CO"h~code "DF"h). For example, code "CO"h indicates control of contrast in the case of the video command, control of volume in the case of the audio command, repeat in the case of the deck/player command, and control of band in the case of the tuner command.

Further, control commands such as video camera commands or timer commands, etc. share, e.g., the area of the special function command group (code "EO"h~code "FF"h). For example, code "EO"h indicates control of zoom in the video camera command, and year in the case of timer command.

On the other hand, so called ASCTII code, controlling value code and alias code are assigned to code "20"h~code "5F"h of OPR, and standard OPR is assigned to code "60"h~code "7F"h. In this case, code "OO"h~code "1F"h are reserved.

In more practical sense, e.g., standard OPR (code "60"h~code "7F"h) has common meanings every control commands such as video commands or audio commands described above. For example, code "60"h means ON, code "70"h means OFF, code "63"h means decrement, and code "73"h means increment.

Meanwhile, in HBS, Table Selector (TS) (i.e., general command in which OPC consists of code "B9"h) is placed before the control command to prescribe correspondence relationship between OPC of the control command and the function command or the special function command. In D2B, command Table is selected in terms of default value by DSDA specified by OPC "Begin 2". In actual terms, e.g., in DSDA, video command is selected in TV monitor (sub-device), audio command is selected in audio amplifier, deck/player command is selected in video deck, video player, audio deck and CD player, and tuner command is selected in TV tuner and audio tuner.

As described above, in the conventional communication method of D2B, etc., the position of OPC of the control command varies, e.g., in dependency upon the position of data #5, data #4, data #4, data #1 of data field 105 and communication form (kinds of communication routes (paths)). Therefore, it is required for device or sub-device on the receiving side to specify the position of OPC prior to carrying out decode of OPC of the control command. For this reason, there was the problem that hardware or software becomes complicated. In addition, also in forming a transmit signal and transmitting such signal, the position of OPC of the control command varies depending upon communication route, resulting in the problem that software, etc. becomes complicated.

OBJECT AND SUMMARY OF THE INVENTION

In view of actual circumstances mentioned above, this invention has been made, and its object is to provide a transmitting method, a receiving method, a communication method, and a bi-directional bus system in which the position in the frame of the control command is fixed, thereby making it possible to simplify software, etc., e.g., for decoding control commands.

To achieve the above-mentioned object, a first transmitting method according to this invention is directed to a transmitting method for a bi-directional bus system in which a plurality of devices respectively including sub-devices adapted to execute the operation with respect to a received control command are connected to each other through a bi-directional bus, wherein one frame of a transmit signal on the bi-directional bus consists of an address field for specifying addresses of devices between which communication is carried out and a data field for specifying a control command for device or sub-device, and a route select code of a fixed length indicating communication from a sub-device included in a device to any other device, communication from a device to a sub-device included in any other device, or communication from a device to any other device is inserted at a predetermined position of the data field, thus to transmit, through the bi-directional bus, a transmit signal in which the route select code is inserted.

A second transmitting method according to this invention is characterized in that, in the first transmitting method, the route select code is caused to consist of a header operand indicating communication from a sub-device included in a device to any other device, communication from a device to a sub-device included in any other device, or communication from a device to any other device; and a sub-device address indicating a source sub-device address or a destination sub-device address, thus to allow the sub-device address to be dummy code in communication from the device to any other device.

A first receiving method according to this invention is directed to a receiving method for a bi-directional bus system in which a plurality of devices respectively including sub-devices adapted to execute the operation with respect to a received control command are connected to each other through a bi-directional bus, characterized in that the receiving method comprises: receiving, through the bi-directional bus, a transmit signal having a frame structure consisting of an address field for specifying addresses of devices between which communication is carried out and a data field for specifying a control command for device or sub-device, and including a route select code of a fixed length, inserted at a predetermined position of the data field, indicating communication from a sub-device included in a device to any other device, a communication from a device to a sub-device included in any other device, or a communication from a device to any other device; detecting the route select code from the transmit signal; and detecting, on the basis of the detected route select code, whether a communication carried out is the communication from the sub-device included in the device to any other device, the communication from the device to the sub-device included in any other device, or the communication from the device to any other device.

Further, a second receiving method according to this invention is characterized, in the first receiving method, in that the route select code consists of a header operand indicating a communication from a sub-device included in a device to any other device, a communication from a device to a sub-device included in any other device, or a communication from a device to any other device, and a sub-device address indicating a source sub-device address or a destination sub-device address, and that the receiving method comprises: detecting, on the basis of the header operand, whether a communication carried out is the communication from the sub-device included in the device to any other device, the communication from the device to the sub-device included in any other device, or the communication from the device to any other device; and specifying a source or destination sub-device on the basis of the sub-device address, and recognizing the sub-device address as a dummy code when the communication from the device to any other device is carried out.

Further, a first communication method according to this invention is directed to a communication method for a bi-directional bus system in which a plurality of devices respectively including sub-devices adapted to execute the operation for a received control command are connected to each other through a bi-directional bus, characterized in that one frame of a transmit signal on the bi-directional bus is caused to consist of an address field for specifying addresses of devices between communication is carried out and a data field for specifying a control command for device or sub-device, that a route select code of a fixed length indicating a communication from a sub-device included in a device to any other device, a communication from a device to a sub-device included in any other device, or a communication from a device to any other device is inserted at a predetermined position of the data field, and that the communication method comprises: transmitting a transmit signal in which the route select code is inserted through the bi-directional bus; receiving the transmit signal through the bi-directional bus; detecting the route select code from the transmit signal; and detecting, on the basis of the detected route select code, whether a communication carried out is the communication from the sub-device included in the device to any other device, the communication from the device to the sub-device included in any other device, or the communication from the device to any other device.

Further, a second communication method according to this invention is characterized, in the first communication method, that one frame of a transmit signal is caused to consist of a header field for specifying the header indicating the leading portion of the frame, a master address field for specifying a source device address, a slave address field for specifying a destination device address, a control field for specifying whether a data field is control command or data, and the data field comprised of a control command or data for device or sub-device, and that the route select code is inserted in the data field.

A third communication method according to this invention is characterized, in the first communication method, in that a route select code is caused to consist of a header operand indicating a communication from a sub-device included in a device to any other device, a communication from a device to a sub-device included in any other device, or a communication from a device to any other device, and a sub-device address indicating a source sub-device address or a destination sub-device address, and that in transmission from a device to any other device, the sub-device address is transmitted as a dummy code, and in reception, whether a communication carried out is the communication from the sub-device included in the device to any other device, the communication from the device to the sub-device included in any other device, or the communication from the device to any other device is detected on the basis of the header operand to specify a source or destination sub-device on the basis of the sub-device address, and to recognize the sub-device address as a dummy code when the communication from the device to any other device is carried out.

Further, a fourth communication method according to this invention is characterized, in the first communication method, in that a plurality of kinds of route select codes are prepared, that each route select code is caused to consist of a text header, a header operand indicating a communication from a sub-device included in a device to any other device, a communication from a device to a sub-device included in any other device, or a communication from a device to any other device, and a sub-device address indicating a source sub-device address or a destination sub-device address, and that the kind of the route select codes is indicated by the text header.

A first bi-directional bus system according to this invention comprises a plurality of devices respectively including sub-devices adapted to execute the operation for a received control command; and a bi-directional bus, wherein each of the plurality of device transmit signal formation means for forming a transmit signal having a frame structure consisting of an address field for specifying addresses of devices between which communication is carried out, and a data field for specifying a control command for device or sub-device, and including a route select code of a fixed length, inserted at a predetermined position of the data field, indicating a communication from a sub-device included in a device to any other device, a communication from a device to a sub-device included in any other device, or a communication from a device to any other device to form a transmit signal; and bus output means for outputting the transmit signal formed by the transmit signal formation means to the bi-directional bus, the plurality of devices being connected to each other through the bi-directional bus.

Further, a second bi-directional bus system according to this invention is characterized, in the first bi-directional bus system, in that each device includes user interface means for inputting operation contents, and the transmit signal formation means is operative to form a transmit signal in accordance with an operation content inputted from the user interface means.

Further, a third bi-directional bus system according to this invention comprises a plurality of devices including sub-devices adapted to execute the operation for a received control means, and a bi-directional bus, wherein each of the plurality of devices comprises bus input means for receiving, through the bi-directional bus, a transmit signal having a frame structure consisting of an address field for specifying addresses of devices between which communication is carried out, and a data field for specifying a control command for device or sub-device, and including a route select code of a fixed length, inserted at a predetermined position of the data field, indicating a communication from a sub-device included in a device to any other device, a communication from a device to a sub-device included in any other device, or a communication from a device to any other device; and control means for detecting the route select code from the transmit signal received by the bus input means to detect on the basis of the detected route select code whether a communication carried out is the communication from the sub-device included in the device to any other device, the communication from the device to the sub-device included in any other device, or the communication from the device to any other device, the plurality of devices being connected to each other through the bi-directional bus.

A fourth bi-directional bus system according to a fourth invention is characterized, in the third bi-directional bus system, wherein each sub-device has an input function or/and output function of an audio signal or/and video signal, and each device includes AV signal switching means for switching input/output destination of an inputted audio signal or/and video signal, and the control means is operative to control the AV signal selector means through internal communication means on the basis of control commands.

A fifth bi-directional bus system according to this invention is characterized, in the third bi-directional bus system, in that each device further includes internal communication means for carrying out communication with a sub-device included in the device, the control means has a Table for converting a control command received by bus input means to an internal control command for controlling sub-device to convert the same control command to an internal control command of control contents corresponding to various controlled system sub-devices to transmit any internal command thus obtained to the sub-device through the internal communication means.

A sixth bi-directional bus system according to this invention comprises a plurality of devices respectively including sub-devices adapted to execute the operation for a received control command, and a bi-directional bus, wherein each of the plurality of devices comprises transmit signal formation means for forming a transmit signal having a frame structure consisting of an address field for specifying respective addresses of devices between which communication is carried out, and a data field for specifying a control command for device or sub-device, and including a route select code of a fixed length, inserted at a predetermined position of the data field, indicating a communication from a sub-device included in a device to any other device, a communication from a device to a sub-device included in any other device, or a communication from a device to any other device, and indicating a source sub-device address, a destination sub-device address or a dummy code; bus output means for outputting the transmit signal formed by the transmit signal formation means to the bi-directional bus; bus input means for receiving the transmit signal through the bi-directional bus; and control means for detecting the route select code from the transmit signal received by the bus input means to detect, on the basis of the detected route select code, whether a communication carried out is the communication from the sub-device included in the device to any other device, the communication from the device to the sub-device included in any other device, or the communication from the device to any other device, and to specify a source sub-device, a destination sub-device or a dummy code, the plurality of devices being connected to each other though the bi-directional bus.

In accordance with the first transmitting method according to this invention, a route select code of a fixed length indicating a communication from a sub-device included in a device to any other device, a communication from a device to a sub-device included in any other device, or a communication indicating a device to any other device is inserted at a predetermined position of data field of a transmit signal consisting of an address field and the data field to transmit, through the bi-directional bus, the transmit signal in which the route select code is inserted.

Further, in accordance with the second transmitting method according to this invention, in communication from a device to any other device, a sub-device address of a route select code consisting of a header operand and a sub-device address is caused to be dummy code.

Further, in accordance with the first receiving method according to this invention, a transmit signal consisting of address field and data field and including a route select code of a fixed length inserted at a predetermined position of the data field is received through the bi-directional bus to detect the route select code from the received transmit signal to detect on the detected route select code whether a communication carried out is communication from sub-device included in device to any other device, communication from device to sub-device included in any other device, or communication from device to any other device.

Further, in accordance with the second receiving method according to this invention, whether a communication carried out is a communication from a sub-device included in a device to any other device, a communication from a device to a sub-device included in any other device, or a communication from a device to any other device is detected on the basis of header operand of a route select code consisting of the header operand and a sub-device address, and a source or destination sub-device is specified on the basis of the sub-device address to recognize the sub-device address as a dummy code when the communication from device to any other device is carried out.

Further, in accordance with the first communication method according to this invention, in transmission, a route select code of a fixed length indicating a communication from a sub-device included in a device to any other device, a communication from a device to a sub-device included in any other device, or a communication from a device to any other device is inserted at a predetermined position of a data field of a transmit signal consisting of an address field and the data field to transmit, through the bi-directional bus, the transmit signal in which the route select code is inserted. In reception, the transmit signal is received through the bi-directional bus to detect the route select code from the received transmit signal to detect on the basis of the detected route select code whether a communication carried out is the communication from the sub-device included in the device to any other device, the communication from the device to the sub-device included in any other device, or the communication from the device to any other device.

Further, in accordance with the second communication method according to this invention, a route select code is inserted into a data field of a transmit signal consisting of a header field, a master address field, a slave address field, a control field and the data field.

Further, in accordance with the third communication method according to this invention, in transmission from a device to any other device, a sub-device address of a route select code consisting of a header operand and the sub-device address is transmitted as a dummy code. In reception, whether a communication carried out is communication from sub-device included in device to any other device, communication from device to a sub-device included in any other device, or a communication from a device to any other device is detected on the basis of the header operand, and a source or destination sub-device is specified on the basis of the sub-device address. When communication from device to any other device is carried out, the sub-device address is recognized as a dummy code.

Further, in the fourth communication method according to this invention, the kind of the route select code is indicated by a text header of a route select code consisting of the text header, a header operand, and a sub-device address.

Further, in accordance with the first bi-directional bus system according to this invention, respective transmit signal formation means of a plurality of devices insert a route select code of a fixed length indicating a communication from a sub-device included in a device to any other device, a communication from a device to a sub-device included in any other device, or a communication from a device to any other device at a predetermined position of data field of a transmit signal consisting of address field and the data field to form a transmit signal. The bus output means outputs this transmit signal to the bi-directional bus.

Further, in accordance with the second bi-directional bus system according to this invention, transmit signal formation means of device forms a transmit signal in accordance with an operation content inputted from user interface means.

Further, in accordance with the third bi-directional bus system, respective bus input means of a plurality of devices receive, through a bi-directional bus, a transmit signal consisting of an address field and a data field and including a route select code of a fixed length inserted at a predetermined position of the data field. The control means detects the route select code from the transmit signal received by the bus input means to detect on the basis of the detected route select code whether a communication carried out is communication from sub-device included in device to any other device, communication from the device to sub-device included in any other device, or communication from device to any other device.

Further, in accordance with the fourth bi-directional bus system according to this invention, the control means of the device controls the AV signal switching means through the internal communication means on the basis of a received control command. The AV signal switching means switches input/output destination of an inputted/outputted audio signal/video signal.

Further, in accordance with the fifth bi-directional bus system according to this invention, the control means of the device converts the same control command to an internal control command of control contents corresponding to various controlled system sub-devices by using a Table for converting a control command received by the bus input means to an internal control command for controlling the sub-device to transmit any internal control command to the sub-device through the internal communication means.

In addition, in accordance with the sixth bi-directional bus system according to this invention, each transmit signal formation means of a plurality of devices inserts a path select code indicating a communication from a sub-device included in a device to any other device, a communication from a device to a sub-device included in any other device, or a communication from a device to any other device, and indicating a source sub-device address, a destination sub-device address, or a dummy code at a predetermined position of a transmit signal consisting of an address field and a data field to form a transmit signal. The bus output means outputs this transmit signal to the bi-directional bus. The bus input means receives the transmit signal through the bi-directional bus. The control means detects the route select code from the received transmit signal to detect on the detected route select code whether a communication carried out is communication from sub-device included in device, communication from device to sub-device included in any other device, or communication from device to any other device, and to specify a source or destination sub-device, or to recognize a dummy code.

BRIEF DESCRIPTION OF THE DRAWINGS

FIG. 3 is a view for explaining OPR of OPC "Begin 2".

FIG. 5 is a view showing a command Table of the D2B frame format.

FIGS. 8A–18B are views showing the structure of a connector of a bi-directional bus constituting the above-mentioned bi-directional bus system.

FIG. 9 is a view showing a frame format of a transmit signal.

FIG. 10 is a view showing a format of HDOPR of a transmit signal.

FIGS. 11A–11C are views showing actual examples of a transmit signal.

FIG. 12 is a view showing a command Table of deck/player.

FIG. 13 is a view showing another example of the command Table of deck/player.

FIG. 14 is a view showing a command Table of a tuner.

FIG. 15 is a view showing another example of command Table of the tuner.

DESCRIPTION OF THE PREFERRED EMBODIMENT

A preferred embodiment of a transmitting method, a receiving method, and a communication method for a bi-directional bus system and a bi-directional bus system will now be described with reference to the attached drawings. In the embodiment, this invention is applied to D2B (Audio, Video and audiovisual systems Domestic Digital Bus) standardized by the publication 103 of the so-called IEC, or a Home Bus System (hereinafter abbreviated as HBS) standardized by ET-2101 of EIAJ.

Figure 6:
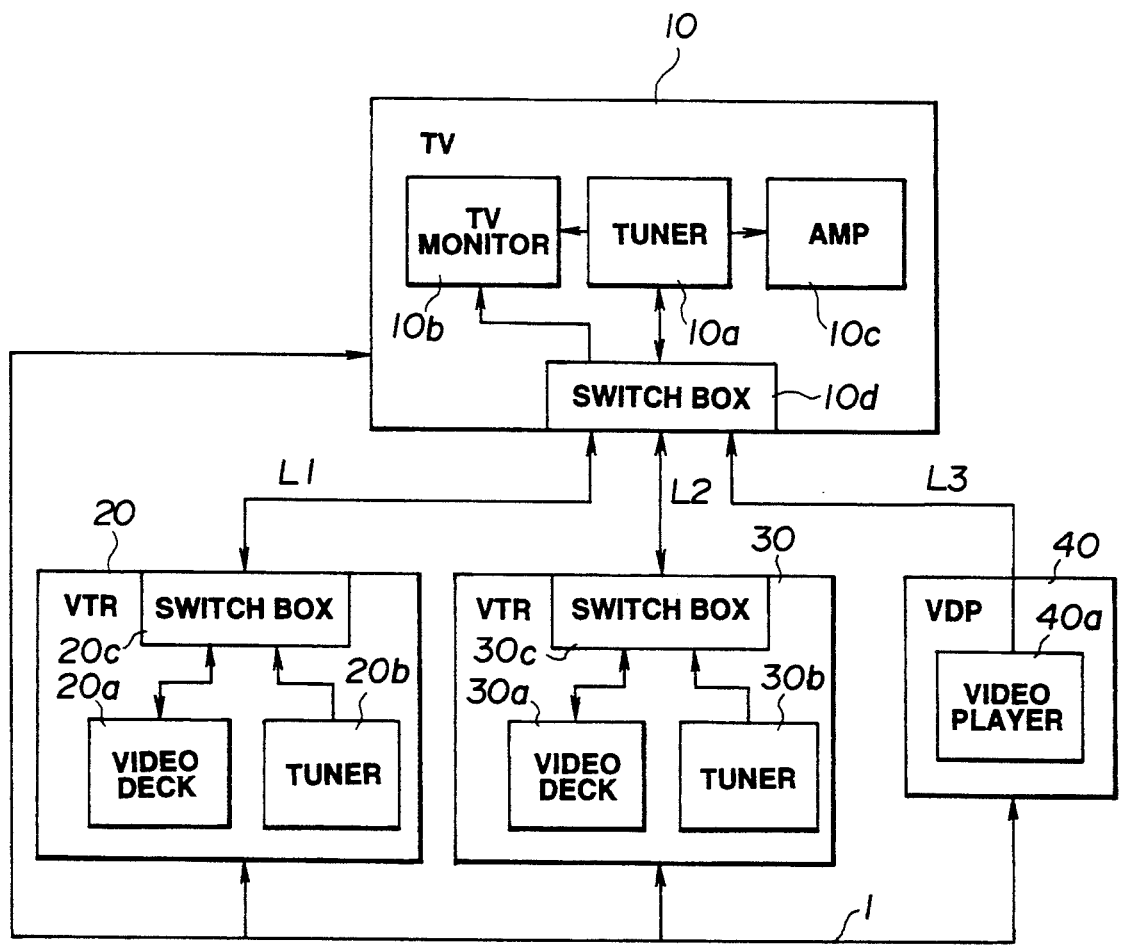
FIG. 6 is a block diagram showing an actual configuration of a bi-directional bus system to which this invention is applied.

A bi-directional bus system to which this invention is applied has a configuration such that a television image receiver (hereinafter each abbreviated as TV) 10 which is a device, video tape recorders (hereinafter abbreviated as VDP) 20, 30 which are a device, and a video deck player (hereinafter abbreviated as VDP) 40 which is a device are connected to each other through a bi-directional bus 1, as shown in FIG. 6, for example.

The TV10 includes therein, as a sub-device, as shown in the above-mentioned FIG. 6, a tuner 10a adapted to receive a television (broadcasting) signal to reproduce a video signal and an audio signal therefrom, a TV monitor 10b for displaying a picture based on the video signal reproduced at the tuner 10a, and an amplifier 10c for amplifying the audio signal reproduced by the tuner 10a, and further comprises, as a sub-device, a switch box 10d for outputting a video signal/audio signal (hereinafter referred to as an AV signal) from the tuner 10a, or delivering the AV signal inputted from the external to the tuner 10a and the TV monitor 10b.

Figure 1:
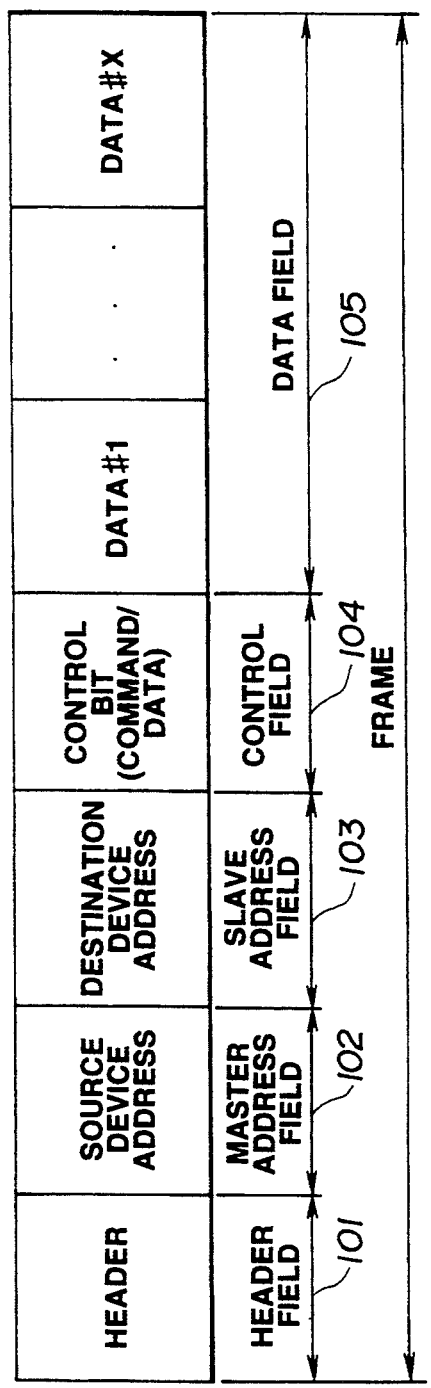
FIG. 1 is a view showing a conventional D2B frame format.

Further, the VTR 20 includes as a sub-device therein, as shown in the above-mentioned FIG. 1, a video deck 20a adapted for recording an AV signal onto a magnetic tape, or reproducing the AV signal therefrom, and a tuner 20b adapted to receive a television (broadcasting) signal to reproduce an AV signal therefrom, and further comprises, as a sub-device, a switch box 20c adapted for outputting an AV signal from the video deck 20a or the tuner 20b to the external, or delivering an AV signal inputted from the external to the video deck 20a.

Further, the VTR30 includes therein, as a sub-device, a video deck 30a, a tuner 30b, and a switch box 30c similarly to the above-described VTR20, In addition, the VDP 40 includes, as a sub-device, a video player 40a for reproducing an AV signal from an optical disk, In this bi-directional bus system, e.g., video signals reproduced by VTR20, VTR30, VDP40 are delivered to the TV10 to display a picture based on this video signal, In actual terms, the switch box 10d of the TV10 and the switch box 20c of the VTR20 are connected by an AV signal line L1, the switch box 10d of the TV10 and the switch box 30c of the VTR30 are connected by an AV signal line L2, and the switch box 10d of the TV10 and the video player 40a are connected by an AV signal line L3, viz,, AV signal lines L1, L2, L3 are wired in a star form with the TV10 being as a center. Accordingly, AV signals reproduced by VTR20, VTR30, VDP40 are respectively delivered to the TV monitor 10b through the AV signal lines L1, L2, L3 and the switch box 10d. Thus, pictures corresponding thereto are displayed on the TV monitor 10b. Further, e.g., an AV signal reproduced by the video player 40a is delivered to the video deck 20a through the AV signal line L3, the switch box 10d, the AV signal line L1, and the switch box 20c. Thus, they are recorded (image-recorded) onto a magnetic tape.

Further, in this bi-directional bus system, e.g., the TV10 (device) controls, through the bi-directional bus, VTRs20, 30, VDP40 (devices) or video decks 20a, 30a, video player 40a, switch box 20c, 30c (sub-devices) included therein, or transmits, through the bi-directional bus 1, data indicating the operating states (statuses) of these equipments (devices or sub-devices).

Figure 7:
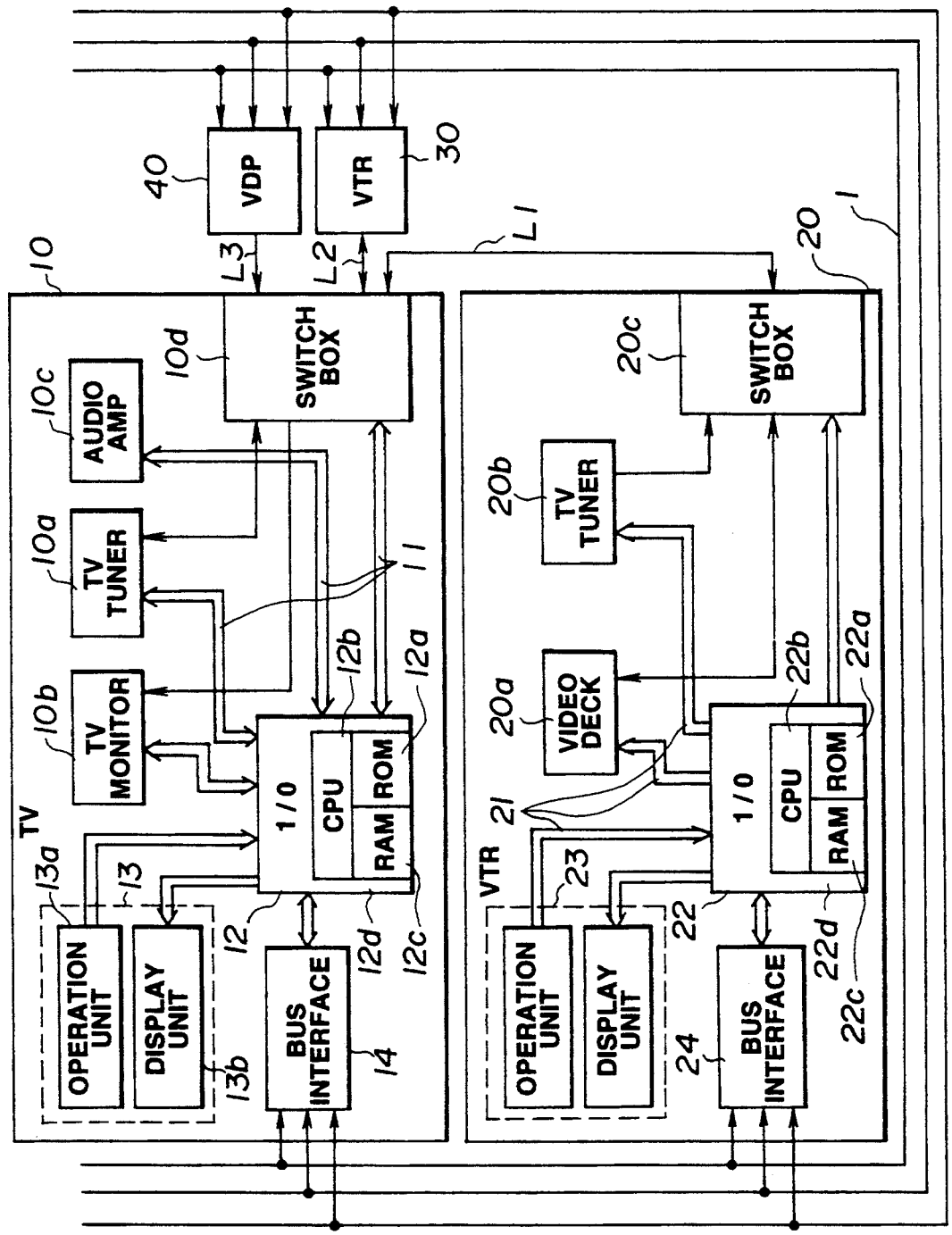
FIG. 7 is a block diagram showing an actual configuration of TV, VTR constituting the above-mentioned bi-directional bus system.

In actual terms, the TV10 comprises, as shown in FIG. 7, for example, a microprocessor 12 for controlling the tuners 10a~switch box 10d through the internal control bus 11, a user interface unit 13 for inputting operation contents operated by user to the microprocessor 12, and a bus interface circuit 14 for inputting a transmit signal consisting of control commands for controlling other devices and sub-devices thereof or data from the bi-directional bus 1 and outputting it thereto.

Further, the VTR20 comprises, as shown in the above-mentioned FIG. 7, a microprocessor 22 for controlling the video deck 20a~switch box 20c through an internal control bus 21, a user interface unit 23 for inputting operation contents operated by user to the microprocessor 22, and a bus interface circuit 24 for inputting a transmit signal from the bi-directional bus 1 or outputting it thereto. Further, VTR30, VDP40 similarly comprise a microprocessor and a bus interface circuit (not shown), etc.

In operation, when, e.g., user operates the user interface unit 13 of the TV10 for the purpose of viewing, on the TV10, a picture based on a video signal reproduced by the VTR20, the microprocessor 12 of the TV10 forms a transmit signal in accordance with an operation content to transmit this transmit signal to the VTR20 through the bus interface circuit 14 and the bi-directional bus 1. The microprocessor 22 of the VTR20 carries out a control to play (reproduce) the video deck 20a through the internal control bus 21 on the basis of the transmit signal received by the bus interface circuit 24, and controls the switch box 20c so that an AV signal reproduced by the video deck 20a is delivered to the TV10.

Namely, the user interface unit 13 comprises, as shown in the above-mentioned FIG. 7, an operation unit 13a provided with, e.g., a key switch, etc., and a display unit 13b provided with, e.g., a light emitting diode, etc. The operation unit 13a delivers a signal corresponding to an operation content that user has operated by using a key switch, etc. to the microprocessor through the internal control bus 11.

The microprocessor 12 comprises, as shown in the above-mentioned FIG. 7, a Read Only Memory (hereinafter referred to as ROM) in which command Tables for converting received control commands which will be described later to internal control commands for controlling the tuner 10a∼switch box 10d or various programs are stored, a Central Processing Unit (hereinafter referred to as a CPU) for executing the program stored in the ROM12a, a Random Access Memory (hereinafter referred to as a RAM) 12c for storing result of the execution, or the like and an I/O circuit 12d adapted to interface with the tuner 10a∼bus interface circuit 14. Further, the CPU12b generates a control command for controlling, e.g., VTR20 on the basis of a signal delivered from the operation unit 13a through the internal control bus 11, the I/O circuit 12d to deliver the control command thus generated to the bus interface circuit 14.

The bus interface circuit 14 employs, e.g., so called a CSMA/CD (Carrier Sense Multiple Access with Collision Detection) as an access system for the bi-directional bus 1, and is connected to the bi-directional bus 1 through a connector standardized, e.g., by so called IEC/SC48B (Secretariat) 202.

Figure 8:
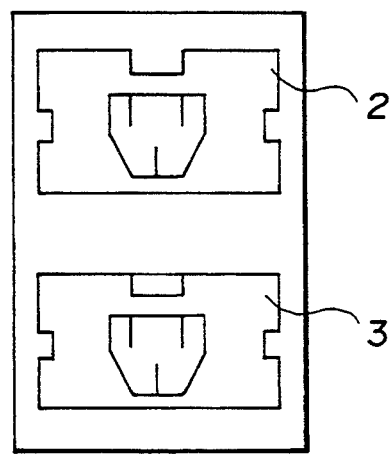
Figure 8:
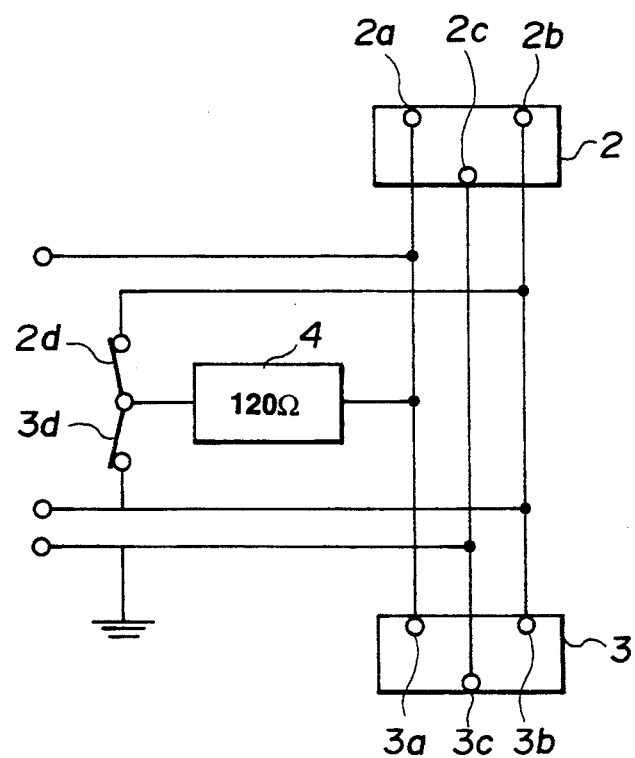

In more practical sense, this connector comprises, as shown in FIG. 8A, two sockets 2, 3. As shown in FIG. 8B, contacts 2a, 2b for signal, a contact 2c for earth of the socket 2, and contacts 3a, 3b for signal and contact 3c for earth of the socket 3 are connected to each other within the connector. Further, contacts 2a and 2b are connected through a switch 2d and a terminating resistor (e.g., 120 m ohm) 4, and contacts 3a and 3b are connected through a switch 3d and the terminating resistor 4.

Connectors constructed in this way are respectively provided every respective devices such as TV10, etc, Like connectors provided in the VTR20, for example, when a plug of the bi-directional bus 1 from the TV10 and a plug of the bi-directional bus 1 from the VTR30 are respectively inserted into sockets 2, 3, the switches 2d, 3d are opened so that the terminating resistor 4 is cut off. As a result, a transmit signal from the TV10 is delivered to the bus interface circuit 24 of the VTR20, and is delivered to VTR30 or VDP40 of the succeeding stage.

Figure 9:
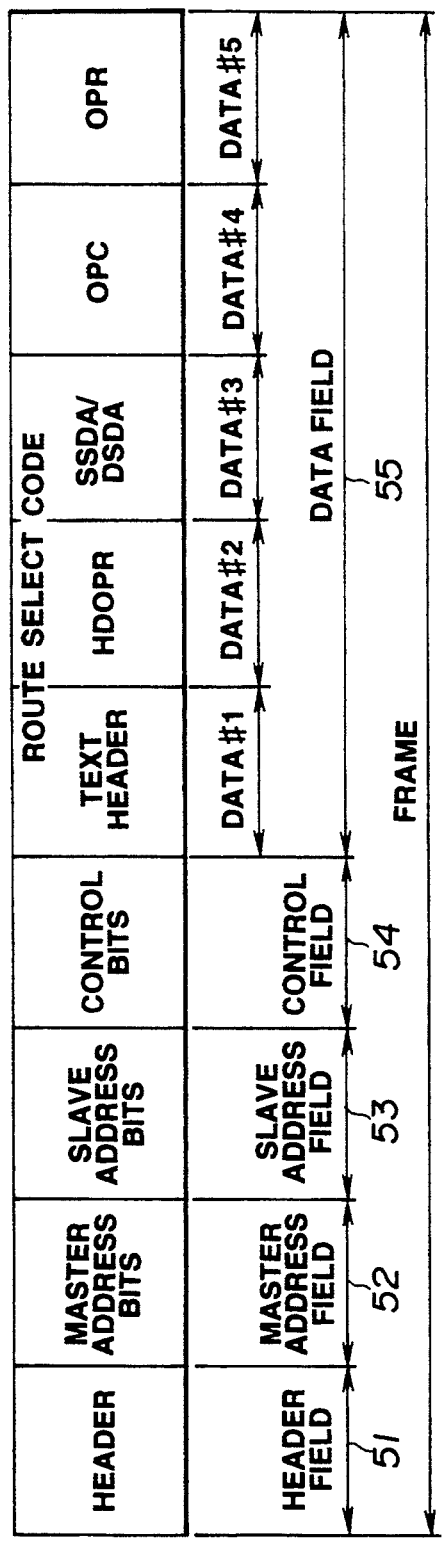

The format of a transmit signal transmitted on the bi-directional bus 1 will now be described. The format of this transmit signal is substantially in conformity with the format of D2B described in the prior art, and control commands or data for controlling a destination sub-device, etc. are caused to have a frame structure as shown in FIG. 9. Thus, control commands and data of such structure are transmitted.

Namely, one frame consists of a header field 51 for specifying the header indicating the leading portion of the frame, a master address field 52 for specifying a source device address, a slave address field 53 for specifying a destination device address, a control field 54 for specifying a control bit indicating a communication, etc. in the state where destination device is in lock state, or in the state where the destination device is in non-lock state, and a data field 55 for specifying control commands or data.

Figure 2:
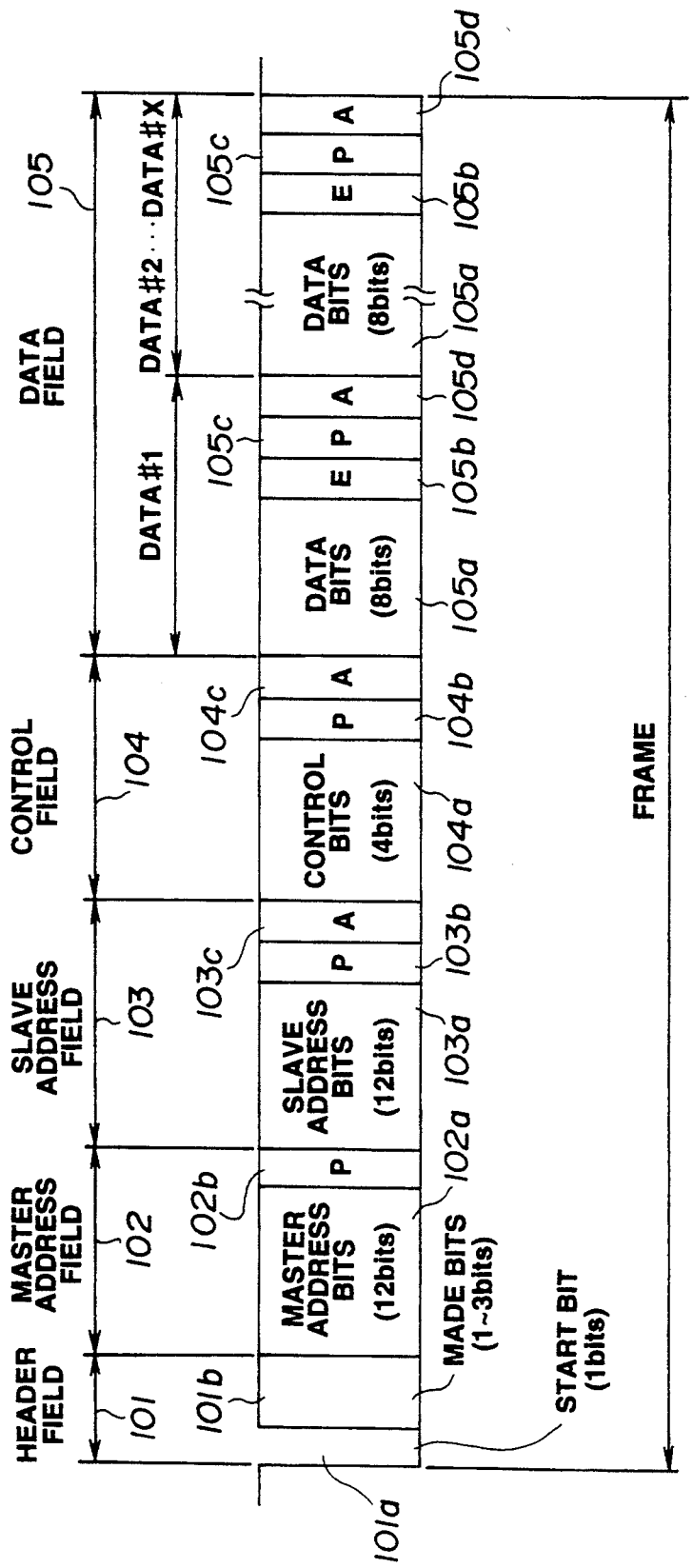
FIG. 2 is a view showing the detail of the conventional D2B frame format.
Figure 4:
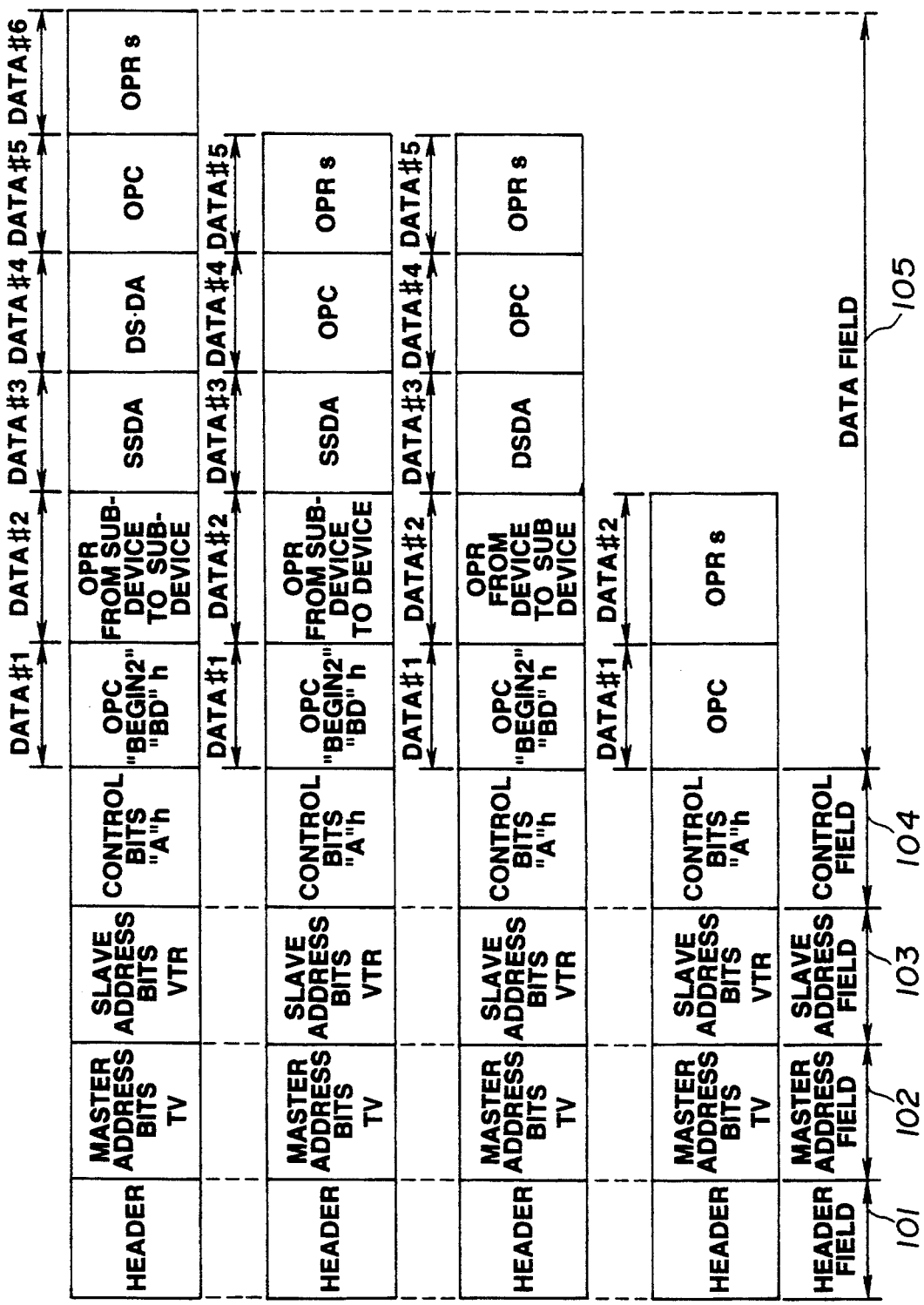
FIGS. 4A–4D are views showing actual examples of a transmit signal of the D2B frame format.

The header of the header field 51 is in conformity with the D2B described in the prior art (see FIG. 2), and consists of a start bit of 1 bit for providing synchronization, and mode bits for prescribing a transmission speed or the number of bytes of the data field 55.

The source device address of the master address field 52 is in conformity with the D2B described in the prior art, and consists of master address bits of 12 bits for specifying a source device address, and a parity bit of 1 bit.

The destination device address of the slave address field 53 is in conformity with the D2B described in the prior art, and consists of slave address bits of 12 bits for specifying a destination device address, and an acknowledge bit of one bit for sending acknowledge from the destination device.

The content of the control field 54 is substantially in conformity with the D2B described in the prior art, and consists of control bits of 4 bits indicating the lock state or the non-lock state, and specifying whether the data field 55 is control command or data, a parity bit of 1 bit, and an acknowledge bit of 1 bit. It is to be noted that as the control bit, there are used only code "E"h (h indicates hexadecimal notation) indicating write in a non-lock state of the control command, code "B"h indicating write in lock state of data, and code "F"h indicating write in a non-lock state, which are codes from master to slave of codes standardized in D2B.

In the data field 55, data bits of 8 bits, end of data bit of 1 bit, and parity bit of 1 bit are repeated as occasions demands in conformity with the D2B described in the prior art. When it is assumed that data bits are assumed to be data #1, #2, #3 . . . from the beginning in order, a route select code of a fixed length, i.e., 24 bits indicating a communication from a sub-device included in a device to any other device, a communication from a device to a sub-device included in any other device, or a communication from a device to any other device is assigned to data #1∼data #3 which are 3 bytes from the beginning as shown in the above-mentioned FIG. 9, for example, at a predetermined position of the data field 55. In addition, control commands, etc. are assigned to data #4.

This routs select code consists of, as shown in the above-described FIG. 9, for example, a text header of 8 bits, a header operand comprised of 8 bits indicating communication from sub-device included in device to any other device, communication from device to sub-device included in any other device, or communication from device to any other device, and a sub-device address comprised of 8 bits indicating a Source Sub-Device Address (hereinafter referred to as SSDA) or Destination Sub-device Address (hereinafter referred to as DSDA). The text header is assigned to data #1 as "AB"h to discriminate from OPC "Begin 2" (code "BD"h), OPC "Begin 1" ("BC"h), OPC "Begin 0" ("BB"h) used in the conventional D2B.

The header operand (hereinafter referred to as HDOPR) subsequent to the text header is assigned to data #2. For example, as shown in FIG. 10, by bits $b_1$, $b_0$ of the lower order 2 bits ($b_7$ is the most significant bit (MSB)), communication from sub-device included in a device to any other device (hereinafter referred to as communication from sub-device to device), communication from device to sub-device included in any other device (hereinafter referred to as communication from device to sub-device), or communication from device to any other device is designated. In more practical sense, $b_1=0$, $b_0=1$ indicates communication from sub-device to device, $b_1=1$, $b_0=0$ indicates communication from device to sub-device, and $b_1=1$, $b_0=1$ indicates communication from device to device. Namely, in this bi-directional bus system, communication from a sub-device included in a device to a sub-device included in any other device used in the conventional D2B is not carried out. In other words, HDOPR where $b_1=0$ and $b_0=0$ is not used.

Accordingly, in carrying out communication from device to sub-device, e.g., sending a control command for playing, e.g., video deck 20a from TV10 (device) to video deck 20a included in VTR 20 (other device), the microprocessor 12 of the TV10 assigns an address of TV10 as master address bits to the master address field 52, assigns an address of VTR20 as slave address bits to the slave address field 53, and assigns code "E"h indicating writing of the control command from master to slave to the control field 54. Further, the microprocessor 12 assigns code "AB" h as a text header to data #1, assigns a code ($b_1=1$, $b_0=0$) indicating communication from device to sub-device to data #2 as HDOPR, and assigns an address of video deck 20a to data #3 as DSDA. Further, in the microprocessor 12 assigns code "C3"h for playing, e.g., the video deck to data #4 subsequent thereto as OPC, and assigns code "75"h indicating forward to data #5 as OPR.

Further, in carrying out communication from sub-device to device, e.g., VTR which has received, e.g., control command of play informs TV10 of the status of the video deck 20a (sub-device), the microprocessor 22 of the VTR20 assigns as shown in FIG. 11B, for example, address of VTR20 to the master address field 52 as master address bits, assigns address of TV10 to the slave address field 53 as a slave address bits, and assigns, e.g., code "E"h indicating write of control command from master to slave to the control field 54. Further, the microprocessor 22 assigns code "AB"h to data #1 as a text header, assigns code ($b_1=0$, $b_0=1$) indicating communication from sub-device to device to data #2 as HDOPR, and assigns address of video deck 20a to data #3 as SSDA. Further, the microprocessor 22 assigns, to data #4, as OPC, e.g., code "C3"h indicating the above-described play, which indicates that, e.g., the video deck 20a is in a reproducing state, and assigns code "75"h indicating forward to data #5 as OPR.

In addition, in carrying out communication from device to device, e.g., allowing the power supply of VTR20 to be turned OFF from TV10, the microprocessor 12 of TV10 assigns, as shown in FIG. 11C, for example, address of TV10 to master address field 52 as a master address, assigns address of VTR20 to the slave address field 53 as slave address bits, and assigns, e.g., code "E"h indicating write of control command from master to slave to control field 54. Further, the microprocessor 12 assigns code "AB"h to data #1 as a text header, and assigns code ($b_1=1$, $b_0=1$) indicating communication from device to device to data #2 as HDOPR.

Meanwhile, in this case, since communication relating the sub-device is not included, i.e., an address of the sub-device is unnecessary, the microprocessor 12 assigns a dummy code, e.g., code "7F"h to data #3. Further, the microprocessor 12 assigns, e.g., code "A0"h indicating standby to data #4 as OPC, and assigns code "70"h indicating ON to data #5 as OPR. Namely, in communication from device to device, the sub-device address is caused to be dummy code, thereby permitting a route select code consisting of text header, HDOPR and sub-device address to have a fixed length irrespective of communication route.

A transmit signal having a frame structure as described above is delivered from the microprocessor 12 to the bus interface circuit 14. The bus interface circuit 14 detects presence or absence of so called a carrier on the bi-directional bus 1 to transmit the transmit signal to VTR20, 30 and VDP40, etc. through the bi-directional bus 1 when there is no carrier, i.e., the bi-directional bus 1 is empty.

For example, the bus interface circuit 24 of the VTR20 receive the transmit signal, and delivers the received transmit signal to the microprocessor 22. The microprocessor 22 executes program (software) stored in, e.g., ROM 22a to detects, from the transmit signal, the route select code inserted at a predetermined position of the data field 55 to detect on the basis of the detected route select code whether communication carried out is communication from sub-device included in device to any other device, communication from device to sub-device included in any other device, or communication from device to any other device.

In actual terms, the microprocessor 22 detects, on the basis of the master address bits of the master address fields 52 and the slave address bits of the slave address field 53 of the transmit signal, that this transmit signal is a transmit signal for the microprocessor 22 from, e.g., TV10, and detects, on the basis of the code of the control field 54, that this code indicates write of the control command from master to slave. It is to be noted that microprocessors of VTR30 and VDP40 detect that a current communication is not a communication for VTR or VDP from the fact that the slave address bits do not corresponds to their own addresses, thus not to carry out the operation corresponding to that transmit signal.

Further, the microprocessor 22 detects, on the basis of the text header assigned to data #1 of the data field 55, that a current code is not OPC "Begin 2" (code "BD"h), OPC "Begin 1" ("BC"h), or OPC "Begin 0" ("BB"h) used in the conventional D2B by, e.g., code "AB"h, and detects the kind of communications on the basis of HDOPR assigned to data #2, i.e., when, e.g., the lower order 2 bits are 1, 0 ($b_1=1$, $b_0=0$), the microprocessor 22 detects that a current communication is communication from device to sub-device; when those bits are $b_1=0$, $b_0=1$, it detects that current communication is communication from sub-device to device, and when those bits are $b_1=1$, $b_0=1$, it detects that current communication is communication from device to device. Namely, even if a transmit signal in conformity with the conventional D2B is transmitted through the same bi-directional bus 1, discrimination therebetween can be made. In other words, by carrying out transmission with the kind of the route select code being specified to the text header of the route select code, it is possible to transmit a transmit signal in conformity with the conventional D2B and a transmit signal to which this invention is applied through the same bi-directional bus 1.

At the time of communication from device to sub-device, the microprocessor 22 recognizes that DSDA is assigned to data #3. At the time of communication from sub-device to device, the microprocessor 22 recognizes that SSDA is assigned to data #3. Further, at the time of communication from device to device, the microprocessor 22 recognizes that data #3 is dummy code "7F"h. In addition, the microprocessor 22 specifies, on the basis of DSDA assigned to, e.g., data #3, that a current control is, e.g., control for video deck 20a.

Meanwhile, respective equipments (devices) such as VTR20, etc. have a command Table for converting control commands to internal control commands for controlling sub-devices every sub-devices that those devices include therein, thus to convert (decode) the same control command to internal control command of control contents corresponding to various control led system sub-devices. In more practical sense, in a ROM 22a of the microprocessor 22, for example, a command Table for video deck 20a, a deck/player command Table and a command Table for tuner 20b as shown in FIGS. 12, 13, for example, and a tuner command Table as shown in FIGS. 14, 15, for example, are stored. The microprocessor 22 decodes control commands assigned to data #4, #5 of the data field 55 into internal control commands for controlling the video deck 20a~switch box 20c on the basis of these command Tables to control the video deck 20a~switch box 20c through the internal control bus on the basis of the internal control commands. Namely, e.g., in OPC of the control commands, code "CO"h indicates a repeat in the deck/player command, as shown in the above-mentioned FIG. 12, indicates control of the band in the tuner commands, as shown in the above-mentioned FIG. 14, indicates control of contrast (not shown) in the video command, and indicates control of volume (not shown) in the audio command. In other words, a command Table determined by a default value of a sub-device specified by DSDA is used. As a result, code of the same control command can be commonly used so as to cope with various sub-devices. Thus, the control command can be shortened. In addition, since the control command can be shortened, the transmission efficiency can be improved.

For example, as shown in the above-mentioned FIG. 11A, when DSDA is video deck 20a, OPC of the control command is code "C3"h, and OPR is code "75"h, the microprocessor 22 of the VTR20 decodes a control command into an internal control command indicating play and forward by using the deck/player command Table to carry out a control so that the video deck 20a conducts a reproducing operation through the internal control bus 21, and to carry out a control so that an AV signal from the video deck 20a is delivered to the switch box 10d of TV10 through switch box 20c. In this way, communication from TV10 (device) to video deck 20a (sub-device) of VTR20 is carried out. Thus, user can view, on TV10, a picture based on the AV signal reproduced by the VTR20, Further, as shown in the above-mentioned FIG. 11B, for example, when SSDA is video deck 20a, OPC of control command is "C3"h (play) and OPR is code "75"h (forward), the microprocessor 12 of TV10 receives the information that video deck 20a of VTR20 is in a reproducing state, Thus, communication from video deck 20a (sub-device) of VTR20 to TV10 (device) is carried out.

Further, as shown in the above-mentioned FIG. 11C, for example, when sub-device address (data #3) is dummy code, OPC of control command is code "A0"h (standby), and OPR is code "70"h (ON), the microprocessor 22 of VTR20 controls a power supply (not, shown) so that its control state shifts from ON state to standby state. Thus, communication from TV10 (device) to VTR20 (device) is carried out, so control of the power supply of VTR20 is conducted.

As described above, in this bi-directional system, OPC of control command is transmitted in the state assigned to data #4 of the data field 55 at all times, For example, microprocessor 22 of a destination device can control video deck 20a~switch box 20c or ON/OFF of power supply. In other words, in the format used in the conventional D2B, the position of OPC of the control command varies in dependency upon a communication route (path). As a result, software for decoding control commands was complex. However, the position of OPC of control command is fixed, thereby making it possible to simplify software, In addition, software in forming a frame of a transmit signal can be also more simplified by fixing the position of OPC of the control command as compared to the prior art, It is to be noted that this invention is not, limited to the above-described embodiment, but can be applied to, e.g., a communication to send a request from a device to a sub-device to send an answer from the sub-device to the device, e.g., a communication for automatically informing the status of device, or the like. In addition, it is needles to say that this invention can be applied to e.g., a bi-directional bus system adapted to control AV equipment except for D2B or HBS.

As is apparent from the foregoing description, in accordance with this invention, a route select code of a fixed length indicating communication from a sub-device included in a device to any other device, communication from a device to a sub-device included in any other device, or communication from a device to any other device is inserted at a predetermined position of a data field of a transmit signal consisting of an address field and the data field to transmit, through a bi-directional bus, the transmit signal in which the route select code is inserted, thereby making it possible to fix the position in the data field of the control command irrespective of the communication route (path). Thus, software constituting a frame of a transmit signal can be simplified.

Further, in this invention, in communication from a device to any other device, a sub-device address of a route select code consisting of a header operand and a sub-device address is caused to be a dummy code, thereby permitting the position in data field of the control command to be the same in the case of communication from a sub-device included in a device to any other device, and communication from a device to a sub-device included in any other device. Thus, software constituting a frame of a transmit signal can be simplified.

Further, in this invention, a transmit signal consisting of an address field and a data field and including a path select code of a fixed length inserted at a predetermined position of the data field is received through a bi-directional bus to detect the route select code from the received transmit signal to detect on the basis of the detected route select code whether a communication carried out is communication from sub-device included in device to any other device, communication from device to sub-device included in any other device, or communication from device to device, thereby making it possible to decode data at a predetermined position of data field as a control command. Thus, software for decoding control commands can be simplified.

Further, in this invention, whether a communication carried out is a communication sub-device included in a device to any other device, a communication from a device to a sub-device included in any other device, or a communication from a device to any other device is detected on the basis of a header operand of a route select signal consisting of the header operand and the sub-device address to specify a source or destination sub-device on the basis of the sub-device address, and to recognize the sub-device address as a dummy code when communication from the device to any other device is carried out, thereby permitting the position in the data field of the control command to be the same as that in the case of the communication from sub-device included in device to any other device and the communication from device to sub-device included in any other device. Thus, the software for decoding the control command can be simplified.

Further, in this invention, a route select code is inserted into data field of a transmit signal consisting of a header field, a master address field, a slave address field, a control field, and a data field, thereby making it possible to fix the position of the data field of the control command. Thus, software for the transmitting device and the receiving device can be simplified.

Further, in this invention, the kind of route select codes is indicated by a text header of a route select code consisting of text header, header operand and sub-device address, thereby making it possible to transmit, through the same bi-directional bus, a transmit signal in conformity with, e.g., conventional D2B and a transmit signal to which this invention is applied.

Further, in this invention, transmit signal formation means of device forms a transmit signal in accordance with an operation content inputted from user interface means, thereby making it possible to carry out, e.g., an operation that user controls any other device from user interface means of device.

Further, in this invention, control means of device controls the AV signal switching means through the internal communication means on the basis of a received control command. The AV signal switching means switches input/output destination of an inputted/outputted audio signal/video signal to thereby carry out, e.g., selective switching between a plurality of VTRs, thus permitting user to view on TV monitor a picture based on an AV signal reproduced by the video deck of a selected VTR.

In addition, control means of device decodes the same control command into an internal control command of control contents corresponding to various controlled system sub-devices by using a Table for converting control commands received by bus input means to internal control commands for controlling the sub-device to transmit this internal control command to sub-device through internal communication means, thereby making it possible to commonly use the same control command for different kinds of sub-devices. As a result, the kind of control commands can be reduced, and the control command can be shortened. Thus, the transmission efficiency can be improved.

What is claimed is:

1. A transmitting method for a bi-directional bus system in which a plurality of devices respectively including sub-devices adapted to carry out the operation for a received control command are connected to each other through a bi-directional bus, wherein one frame of a transmit signal on said bi-directional bus consists of an address field for specifying addresses of devices between which communication is carried out, and a data field for specifying a control command for a device or a sub-device, wherein a route select code of a fixed length indicating a communication from a sub-device included in a device to any other device, a communication from a device to a sub-device included in any other device, or a communication from a device to any other device is inserted at a predetermined position of the data field, and wherein the transmit signal in which the route select code is inserted is transmitted through said bi-directional bus.

2. A transmitting method as set forth in claim 1, wherein said route select code consists of a header operand indicating a communication from a sub-device included in a device to any other device, a communication from a device to a sub-device included in any other device, or a communication from a device to any other device, and a sub-device address indicating a source sub-device address or a destination sub-device address, and wherein, in communication from a device to any other device, said sub-device address is caused to be a dummy code.

3. A receiving method for a bi-directional system in which a plurality of devices respectively including sub-devices adapted to execute the operation for a received command are connected to each other through a bi-directional bus, the receiving method comprising:

receiving, through said bi-directional bus, a transmit signal having a frame structure consisting of an address field for specifying addresses of devices between which communication is carried out, and a data field for specifying a control command for a device or a sub-device, and including a route select code of a fixed length, inserted at a predetermined position of the data field, indicating a communication from a sub-device included in a device to any other device, a communication from a device to a sub-device included in any other device, or a communication from a device to any other device;

detecting the route select signal from said transmit signal; and detecting on the basis of the detected route select code whether a communication carried out is a communication from a sub-device included in a device, a communication from a device to a sub-device included in any other device, or communication from a device to any other device.

4. A receiving method as set forth in claim 3, wherein said route select code consists of:

a header operand indicating a communication from a sub-device included in a device to any other device, a communication from a device to a sub-device included in any other device, or a communication from a device to any other device; and a sub-device address indicating a source sub-device address or a destination sub-device address, said receiving method further comprising:

detecting on the basis of the header operand whether a communication carried out is a communication from a sub-device included in a device to any other device, a communication from a device to a sub-device included in any other device, or a communication from a device to any other device, and specifying, on the basis of the sub-device address, a source or destination sub-device, and recognizing the sub-device address as a dummy code when a communication from a device to any other device is carried out.

5. A communication method for a bi-directional bus system in which a plurality of devices respectively including sub-devices adapted to execute the operation for a received control command are connected to each other through a bi-directional bus, wherein one frame of a transmit signal on said bi-directional bus consists of an address field for specifying addresses of devices between which communication is carried out, and a data field for specifying a control command for a device or a sub-device, and a route select code of a fixed length indicating a communication from a sub-device included in a device to any other device, a communication from a device to a sub-device included in any other device, or a communication from a device to any other device is inserted at a predetermined position of the data field, said communication method comprising:

transmitting, through said bi-directional bus, the transmit signal in which the route select code is inserted, receiving the transmit signal through the bi-directional bus, detecting the route select code from the transmit signal, and detecting on the basis of the detected route select code whether a communication carried out is a communication from a sub-device included in a device to any other device, a communication from a device to a sub-device included in any other device, or a communication from a device to any other device.

6. A communication method as set forth in claim 5, wherein one frame of the transmit signal consists of:

a header field for specifying the header indicating the leading portion of the frame, a master address field for specifying a source device address, a slave address field for specifying a destination device address, a control field for specifying whether said data field is control command or data, and the data field consisting of control commands or data for a device or a sub-device, said route select code being inserted into said data field.

7. A communication method as set forth in claim 5, wherein said route select code consists of a header operand indicating a communication from a sub-device included in a device to any other device, a communication from a device to a sub-device included in any other device, or a communication from a device to any other device, and a sub-device address indicating a source sub-device address or a destination sub-device address, said communication method further comprising:

transmitting said sub-device address as a dummy code in a communication from a device to any other device, detecting, on the basis of said header operand, in reception whether a communication carried out is a communication from a sub-device included in a device to any other device, a communication from a device to a sub-device included in any other device, or a communication from a device to any other device, and specifying a source or destination sub-device on the basis of the sub-device address, and recognizing said sub-device address as a dummy code when a communication from a device to any other device is carried out.

8. A communication method as set forth in claim 5, wherein plural kinds of route select, codes are provided, and wherein said route select code consists of a text header, a header operand indicating a communication from a sub-device included in a device to any other device, a communication from a device to a sub-device included in any other device, or a communication from a device to any other device, and a sub-device address indicating a source sub-device address or a destination sub-device address, the kind of route select code being indicated by said text header.

9. A bi-directional bus system comprising a plurality of devices respectively including sub-devices adapted to execute the operation for a received control command and a bi-directional bus each of said plurality of devices comprising:

transmit signal formation means for forming a transmit, signal having a frame structure consisting of an address field for specifying addresses of devices between which communication is carried out, and a data field for specifying a control command for a device or sub-device, and including a route select code of a fixed length, inserted at a predetermined position of the data field, indicating a communication from a sub-device included in a device to any other device, a communication from a device to a sub-device included in any other device, or a communication from a device to any other device; and bus output means for outputting, to said bi-directional bus, the transmit signal formed by said transmit signal formation means, said plurality of devices being connected to each other through said bi-directional bus.

10. A bi-directional bus system as set forth in claim 9, wherein each device includes user interface means for inputting an operation content, and wherein said transmit signal formation means forms the transmit signal in accordance with the operation content inputted from said user interface means.

11. A bi-directional bus system comprising a plurality of devices respectively including sub-devices adapted to execute the operation for a received control command, and a bi-directional bus, each of said plurality of devices comprising:

bus input means for receiving, through said bi-directional bus, a transmit signal having a frame structure consisting of an address field for specifying addresses of devices between which communication is carried out, and a data field for specifying a control command for a device or a sub-device, and including a route select code of a fixed length, inserted at a predetermined position of the data field, indicating a communication from a sub-device included in a device to any other device, a communication from a device to a sub-device included in any other device, or a communication from a device to any other device; and control means for detecting the route select code from the transmit signal received by said bus input means to detect on the basis of the detected route select code whether a communication carried out is a communication from a sub-device included in a device to any other device, a communication from a device to a sub-device included in any other device, or a communication from a device to any other device, said plurality of devices being connected to each other through said bi-directional bus.

12. A bi-directional bus system as set forth in claim 11, wherein each sub-device has a function to input or-/and output an audio signal or/and a video signal, wherein each device comprises AV signal switching means for switching an input/output destination of inputted/outputted audio signal or/and video signal; and internal communication means for carrying out communication with sub-devices included therein, and wherein said control means controls said AV signal switching means through said internal communication means on the basis of said control command.

13. A bi-directional bus system as set forth in claim 11, wherein each device comprises internal communication means for carrying out communication with sub-devices included therein; and wherein said control means has a table for converting a control command received by said bus input means to an internal control command for controlling a sub-device, and adapted to convert the same control command to an internal control command of control contents corresponding to various controlled system sub-devices to transmit the internal control command to sub-devices through said internal communication means.

14. A bi-directional bus system comprising a plurality of devices respectively including sub-devices adapted to execute the operation for a received control command, and a bi-directional bus, each of said plurality of devices comprising:

transmit signal formation means for forming a transmit signal having a frame structure consisting of an address field for specifying addresses of devices between which communication is carried out, and a data field for specifying a control command for a device or a sub-device, and including a route select code of a fixed length, inserted at a predetermined position of the data field, indicating a communication from a sub-device included in a device to any other device, a communication from a device to a sub-device included in any other device, or a communication from a device to any other device, and indicating a source sub-device address, a destination sub-device address or a dummy code;

bus output means for outputting the transmit signal formed by said transmit signal formation means to said bi-directional bus;

bus input means adapted to receive the transmit signal through said bi-directional bus; and control means for detecting the route select code from the transmit signal received by said bus input means to detect on the basis of the detected route select code whether a communication carried out is a communication from a sub-device included in a device to any other device, a communication from a device to a sub-device included in any other device, or a communication from a device to any other device, and specifying a source sub-device, a destination sub-device, or a dummy code, said plurality of devices being connected to each other through said bi-directional bus.

* * * * *